(12) United States Patent
Aoki et al.

(10) Patent No.: US 11,539,261 B2
(45) Date of Patent: Dec. 27, 2022

(54) BREATHER DEVICE

(71) Applicant: TOYOTA JIDOSHA KABUSHIKI KAISHA, Toyota (JP)

(72) Inventors: Kazutaka Aoki, Toyota (JP); Kentaro Haruno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 16/999,117

(22) Filed: Aug. 21, 2020

(65) Prior Publication Data

US 2021/0066992 A1 Mar. 4, 2021

(30) Foreign Application Priority Data

Aug. 26, 2019 (JP) .............................. JP2019-153961

(51) Int. Cl.
| | |
|---|---|
| *F16K 15/02* | (2006.01) |
| *H02K 5/20* | (2006.01) |
| *H02K 5/10* | (2006.01) |
| *H02K 9/04* | (2006.01) |
| *H02K 9/26* | (2006.01) |
| *F16K 24/00* | (2006.01) |
| *F16K 24/02* | (2006.01) |
| *F16K 24/04* | (2006.01) |
| *F16K 24/06* | (2006.01) |

(52) U.S. Cl.
CPC .............. *H02K 5/20* (2013.01); *F16K 24/00* (2013.01); *F16K 24/02* (2013.01); *F16K 24/04* (2013.01); *F16K 24/06* (2013.01); *H02K 5/10* (2013.01); *H02K 9/04* (2013.01); *H02K 9/26* (2013.01); *H02K 2205/09* (2013.01)

(58) Field of Classification Search
CPC .. H02K 5/20; H02K 5/10; H02K 9/04; H02K 9/26; H02K 2205/09; F16K 24/00; F16K 24/02; F16K 24/04; F16K 24/06
See application file for complete search history.

(56) References Cited

U.S. PATENT DOCUMENTS

| | | | | |
|---|---|---|---|---|
| 5,249,598 A | * | 10/1993 | Schmidt | .................. F16K 24/04 |
| | | | | 137/493.1 |
| 2017/0166047 A1 | * | 6/2017 | Iwami | ..................... B60K 15/04 |
| 2018/0097214 A1 | * | 4/2018 | Ogawa | ................ H01M 50/271 |

FOREIGN PATENT DOCUMENTS

| | | |
|---|---|---|
| JP | 2009-106024 A | 5/2009 |
| JP | 2009-168054 A | 7/2009 |

* cited by examiner

*Primary Examiner* — P. Macade Nichols
(74) *Attorney, Agent, or Firm* — Oliff PLC

(57) ABSTRACT

A breather device includes an intake path configured to communicate between an interior space of a target case and an exterior space, an exhaust path configured to communicate between the interior space and the exterior space and at least partially separated from the intake path, an intake valve inserted in the intake path and configured to allow outside air to flow into the interior space only when an internal pressure Pi is lower, at least by a fixed extent, than an external pressure Po, and an exhaust valve inserted in the exhaust path and configured to allow gas within the interior space to flow toward the exterior space only when the internal pressure Pi is higher, at least by a fixed extent, than the external pressure Po, and a water stop filter disposed downstream of the intake valve in an intake air flowing direction in the intake path.

5 Claims, 10 Drawing Sheets

BREATHER DEVICE

CROSS REFERENCE TO RELATED APPLICATION

This application claims priority to Japanese Patent Application No. 2019-153961 filed on Aug. 26, 2019, which is incorporated herein by reference in its entirety including the specification, claims, drawings, and abstract.

TECHNICAL FIELD

This specification discloses a breather device attached to a target case for regulating a pressure of an interior space of the target case.

BACKGROUND

Conventionally, breather devices for regulating the pressure of an interior space of a target case have been known. For example, JP 2009-106024 A discloses a breather device disposed in a motor case (i.e., the target case) which houses a rotary electric machine for vehicle travel. The breather device includes an intake valve which is opened when an internal pressure of the target case becomes lower than an external pressure, and an exhaust valve which is opened when the internal pressure becomes higher than the external pressure.

When the target case is mounted on a movable body, such as a vehicle, as in the case of the breather device of JP 2009-106024 A, the target case and the breather device may be, in some cases, temporarily submerged in water during travel. There has been a demand for preventing entry of water into the target case even under such a submerged condition.

According to a technique employed in JP 2009-106024 A, when the intake valve is opened under a condition that the target case and the breather device are submerged in water, the water around the breather device will enter the target case through the breather device. To prevent the entry of water under the submerged condition in the technique of JP 2009-106024 A, it is necessary that a pressure for opening the intake value be set to a high pressure in order to maintain the intake valve unopened even in a situation where the internal pressure is at a normal pressure while the external pressure is at a water pressure or higher. With this configuration, however, the intake valve is not opened until the internal pressure of the target case becomes significantly lower than the external pressure under a normal condition in which the target case and the breather case are not submerged in water. In other words, an attempt to prevent the entry of water into the target case in the technique of JP 2009-106024 A tends to involve a delay in recovery from a negative pressure to an atmospheric pressure in the interior space of the target case.

Given these circumstances, this specification discloses a breather device capable of preventing the entry of water into a target case while enabling a rapid recovery to a normal pressure in the interior space of the target case.

SUMMARY

In an aspect, a breather case disclosed herein is attached to a target case and is configured to regulate an internal pressure of the target case, the breather case including an intake path which is configured to communicate between an interior space of the target case and an exterior space, an exhaust path which is configured to communicate between the interior space and the exterior space and is at least partially separated from the intake path, an intake valve which is inserted in the intake path and is configured to allow outside air to flow into the interior space only when the internal pressure is lower, at least by a fixed degree, than an external pressure, an exhaust valve which is inserted in the exhaust path and is configured to allow gas within the interior space to flow toward the exterior space only when the internal pressure is higher, at least by a fixed degree, than the external pressure, and a water stop filter which is disposed, in the intake path, upstream of the intake valve in an intake air flowing direction and is configured to allow passage of gas while blocking passage of liquid.

When the water stop filter is disposed, in the intake path, at a position located upstream of the intake valve in the intake air flowing direction, it becomes possible to prevent the entry of liquid, such as, for example, water, even with a setting of a lower pressure for opening the intake valve. As a result, the interior space of the target case can be recovered to a normal pressure more rapidly.

According to another aspect of this disclosure, in the above-described configuration, the intake path and the exhaust path may extend through an inner end which is an end of the interior space, a branching point, a joining point, and an outer end which is an end of the exterior space, and may be shared with each other in a section from the inner end to the branching point and a section from the joining point to the outer end, and be separated from each other in a section from the branching point to the joining point.

When the intake path is partially shared with the exhaust path, the breather device can be minimized in size.

According to another aspect, in the above configuration, the water stop filter may be placed in the intake path in the section from the branching point to the joining point, and a distance from the joining point to the outer end may be shorter than a distance from the joining point to the water stop filter.

With this configuration, exhaust gas having arrived at the joining point can easily flow into the exterior space without flowing toward the water stop filter. As a result, the water stop filter can be effectively prevented from getting clogged with a foreign substance (such as, for example, oil vapor) contained in the exhaust gas.

In a further aspect, the intake path may be bent one or more times in a section from the joining point to the water stop filter.

With this configuration, the exhaust gas having arrived at the joining point is apt to flow into the exterior space without flowing toward the water stop filter. This can ensure that the water stop filter is effectively prevented from getting clogged with a foreign substance (such as, for example, oil vapor) contained in the exhaust gas.

In an aspect, the breather device includes a housing which is attached to the target case and has a main hole defined to be always in communication with the interior space, a first movable member which is configured to be advanceable and retractable between a first closure position where the first movable member is brought into intimate contact with the housing to cover the main hole and a first open position where the first movable member is separated from the housing to allow the main hole to communicate with the exterior space, the first movable member having a sub hole through which the main hole is connected to the exterior space in the first closure position, a second movable member which is disposed in the main hole and is configured to be advanceable and retractable between a second closure position where the second movable member is brought into intimate contact with the first movable member to close the sub hole and a second open position where the second movable member is separated from the sub hole to allow the main hole to communicate through the sub hole with the exterior space, a first urging member which is configured to urge the first movable member toward the first closure position, a second urging member which is configured to urge the second movable member toward the second closure position, and the water stop filter which is disposed so as to be opposite across the sub hole from the second movable member and is configured to cover the sub hole. Further, in the breather device, the first movable member and the first urging member cooperatively function as the exhaust valve, the second movable member and the second urging member cooperatively function as the intake valve, and the first movable member may be composed of a material having a higher degree of elasticity than that of the second movable member and the housing.

When the first movable member is composed of the material having the higher degree of elasticity than the second movable member and the housing, adhesion of the first movable member to the second movable member and the housing can be enhanced, which can ensure that air leakage is reliably prevented.

The target case may be a motor case for housing a motor.

A high voltage is applied to a stator coil of the motor. When an atmospheric pressure is decreased around the motor, electrical discharge is apt to occur. An excessive decrease in the atmospheric pressure around the motor can be prevented when the breather device incorporating the water stop filter as described above is mounted on the motor case in which the motor is housed. As a result, the occurrence of electrical discharge can be effectively prevented.

According to the breather device disclosed herein, it becomes possible to prevent entry of water into the target case while enabling rapid recovery of the inside of the target case to a normal pressure.

BRIEF DESCRIPTION OF DRAWINGS

Embodiments of the present disclosure will be described based on the following figures, wherein.

DESCRIPTION OF EMBODIMENTS

Hereinafter, a configuration of a breather device 10 will be described with reference to the drawings. It should be noted that in the following description, the term "normal pressure" denotes a pressure of atmosphere around a motor unit 100 that is measured under a condition where neither decompression nor pressurization is performed in an external region around the motor unit 100. Therefore, the normal pressure, which is usually 1 atmospheric pressure, can vary slightly depending on an altitude above sea level, a temperature, or other factors at a location where the motor unit 100 is present.

Figure 1:
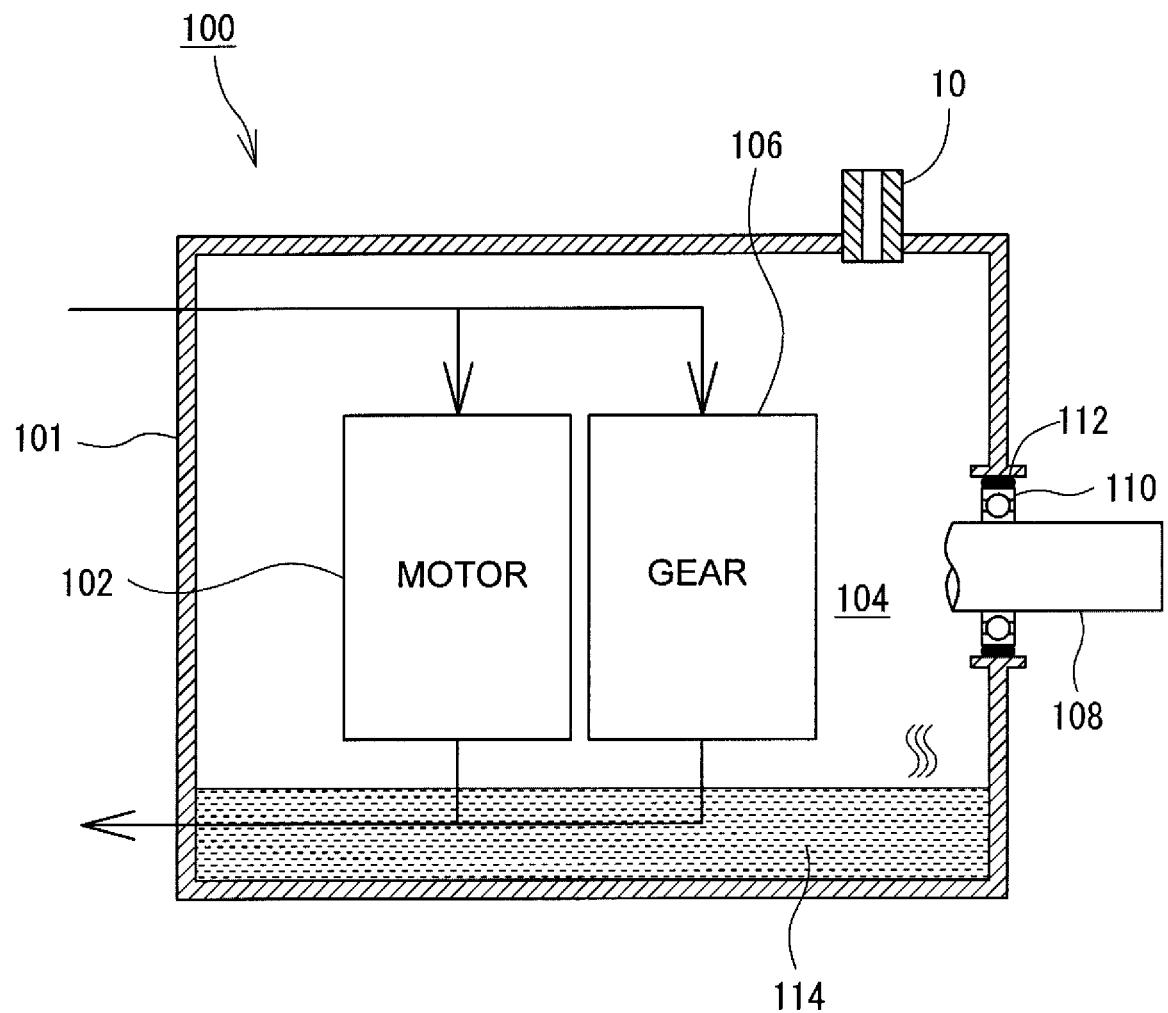
FIG. 1 is a schematic diagram showing a motor unit incorporating a breather device.

FIG. 1 is a schematic diagram showing the motor unit 100 incorporating the breather device 10. Prior to explaining the breather device 10, the motor unit 100 will be briefly described. The motor unit 100 is mounted on an electrically driven vehicle (i.e. a hybrid car or an electric car). The motor unit 100 includes a motor 102 which is one of travel power sources of the electrically driven vehicle, and a speed reduction gear 106 for reducing the speed of a driving force output from the motor 102. The motor 102 and the gear 106 are housed within a motor case 101. The motor case 101 is a target case to which the breather device 10 is attached, and has an interior space 104 isolated from the outside. The driving force which is reduced in speed by the gear 106 is transmitted via an output shaft 108 to an external unit. The output shaft 108 is rotatably supported via a bearing 110 by the motor case 101.

The motor 102 and the gear 106 are supplied with an ATF 114. The ATF 114 is an oil used for cooling the motor 102 and lubricating the gear 106. After passing through the motor 102 and the gear 106, the AFT 114 flows down to a bottom portion of the motor case 101 and is stored therein. Then, the ATF 114 is collected and resupplied to the motor 102 and the gear 106 for the cooling and lubrication thereof. An oil seal 112 is provided between the bearing 110 and the motor case 101 in order to prevent leakage of the ATF 114.

Here, as has been well known, the motor 102 produces heat when it is driven. In this regard, the temperature of the interior space 104 within the motor case 101 can change in response to a driving condition of the motor 102. When a temperature of the inside of the motor case 101 becomes high, air within the motor case 101 expands, leading to an increase in pressure within the motor case 101 (hereinafter referred to as an "internal pressure Pi"). At an excessively increased internal pressure Pi, there has been a danger that the oil seal 112 is no longer able to seal the motor case 101, resulting in leakage of the ATF 114 to the outside. On the other hand, when the temperature within the motor case 101 becomes low, the internal pressure Pi is accordingly decreased. At an excessively decreased internal pressure Pi, the ATF 114 may be boiled due to decompression, and thus caused to froth up. Then, there has been a danger that lubrication is deteriorated due to the frothing of the ATF 114. In general, when the internal pressure Pi is decreased, a voltage at which electrical discharge is triggered is accordingly lowered, which increases the occurrence of electrical discharge.

Meanwhile, some electrically driven vehicles are configured to detect a pressure of surroundings around the motor 102 with a pressure sensor, and control, based on the detected pressure, allowable values of voltage to be applied.

In this configuration, the pressure sensor is arranged at a location free of the ATF 114; i.e. outside the motor case 101. Therefore, when a difference between the internal pressure Pi and a pressure in the outside of the motor case 101 (hereinafter referred to as an "external pressure Po") becomes greater (the difference which will be referred to as an internal-external pressure difference ΔP), it is impossible to appropriately control the allowable values of voltage to be applied.

In other words, the internal pressure Pi which is greatly changed from the normal pressure will cause a problem regardless of whether it is excessively higher or lower than the normal pressure. Keeping the internal pressure Pi at the normal pressure can be achieved by forming, in the motor case 101, an opening which is always in communication with an exterior space. However, in the presence of the opening, dust may enter the motor case 101, or the ATF 114 may be leaked to the outside, which can have a detrimental effect on operation of the motor 102 and the gear 106. Because the motor unit 100 is mounted on the electrically driven vehicle being a moving body, the entire motor case 101 may be, although temporarily, submerged in water during travel of the electrically driven vehicle. In such a case, when the opening which allows the interior space 104 to be always in communication with the exterior space is present, water can enter the motor case 101, and thus cause an electric device, such as the motor 102, to malfunction.

Given these circumstances, the breather device 10 is installed in a top region of the motor case 101 for the purpose of allowing the internal pressure Pi to follow the normal pressure while preventing the entry of water and dust. Components and structure of the breather device 10 will be explained with reference to FIGS. 2 to 4.

Figure 2:
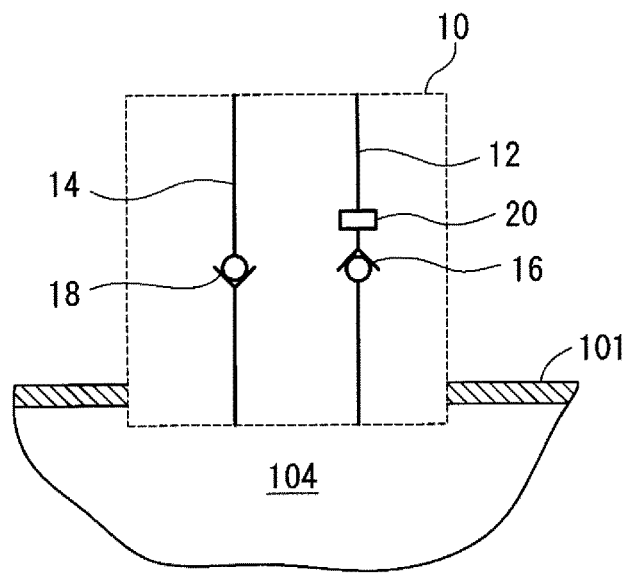
FIG. 2 is a schematic diagram showing the most basic configuration of the breather device.

FIG. 2 is a schematic diagram showing the most basic configuration of the breather device 10. As shown in FIG. 2, the breather device 10 has two paths for communicating the interior space 104 with the exterior space; i.e., includes an intake path 12 and an exhaust path 14. The exhaust path 14 is equipped with an exhaust valve 18 which is a check valve configured to be opened for discharging gas from the interior space 104 to the exterior space only when the internal pressure Pi is higher, at least by a fixed degree, than the external pressure Po. The intake path 12 includes an intake valve 16 which is a check valve configured to be opened for introducing gas from the exterior space into the interior space 104 only when the internal pressure Pi is lower, at least by a fixed degree, than the external pressure Po. Here, the check valve is typically a valve element movable between an open position and a closure position, and the valve element is always urged toward its closure position. In the intake valve 16 and the exhaust valve 18, an elastic force of an elastic member may be used as an urging force to urge the valve element. The elastic member may be, for example, a spring member, such as a coil spring or a plate spring, or may be a highly elastic material, such as sponge or rubber. Alternatively, the intake valve 16 and the exhaust valve 18 may have structure in which a magnetic force or a gravitational force is used for urging the valve element toward its closure position.

The intake path 12 includes, at a position located upstream of the intake valve 16 in an intake air flowing direction, a water stop filter 20 which allows passage of gas while blocking passage of liquid. The water stop filter 20 is a filter composed of a waterproof and moisture permeable material. The waterproof and moisture permeable material is, for example, a fiber material or a porous material including a large number of pores which are greater in size than water particles in a gaseous state (approximately 0.0004μ) and smaller than water particles in a liquid state (100μ~3000μ). Such a material may include, for example, a PTEF porous material.

The reason for installing the water stop filter 20 will be explained in comparison with an instance where the water stop filter 20 is not installed. It is assumed that the motor unit 100 is temporarily submerged in water, and the intake valve 16 is opened in response to the inner pressure Pi which becomes higher than the external pressure Po. In this situation, if the water stop filter 20 is not installed, water around the motor unit 100 could flow through the intake valve 16 into the motor case 101. To prevent the entry of water into the motor case 101 in the above-described situation, it may be conceived that a pressure for opening the intake valve 16 is sufficiently increased to an extent that the intake valve 16 is not opened even when the external pressure Po becomes equal to the water pressure at the internal pressure Pi equivalent to the normal pressure. In this way, the entry of water can be prevented without the water stop filter 20. However, if the pressure for opening the intake valve 16 is increased to the above-described extent, the intake valve 16 would not be opened for recovery to the normal pressure in response to a certain degree of decrease in the internal pressure Pi under a condition where the motor unit 100 is not submerged in water. This may cause the ATF 114 to bubble up due to decompression boiling, cause frequent occurrence of electrical discharge from the motor 102, or the like.

In contrast, when the water stop filter 20 is installed in the intake path 12 as shown in FIG. 2, water is not able to enter the motor case 101 even though the intake valve 16 is opened in the situation where the motor unit 100 is submerged in water. For this reason, a lower pressure can be specified as the pressure for opening the intake valve 16, which enables prompt recovery of the inside of the motor case 101 to the atmospheric pressure. Consequently, the bubbling of the ATF 114 and the electrical discharge can be effectively prevented.

Meanwhile, in FIG. 2, the intake path 12 is completely separated from the exhaust path 14, which often results in upsizing of the breather device 10. To circumvent the upsizing, the intake path 12 and the exhaust path 14 may be partially overlapped with each other.

Figure 3:
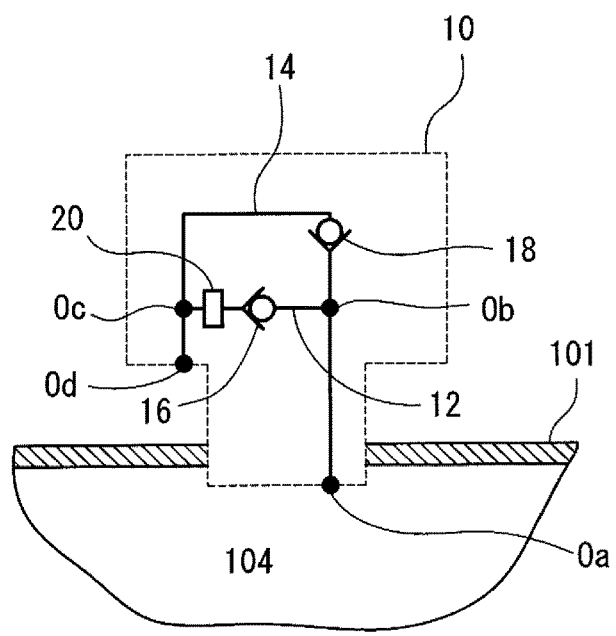
FIG. 3 is a schematic diagram showing a modification example of the breather device.

For example, as shown in FIG. 3, the intake path 12 and the exhaust path 14 may include a common section where the intake and exhaust paths 12 and 14 overlap with each other. Specifically, in the example of FIG. 3, both the intake path 12 and the exhaust path 14 extend through an inner end Oa which is an end on an interior space 104 side, a branching point Ob, a joining point Oc, and an outer end Od which is an end on an exterior space side. Then, the intake path 12 and the exhaust path 14 extend through a mutually shared path in in a section from the inner end Oa to the branching point Ob and in a section from the joining point Oc to the outer end Od. On the other hand, the intake path 12 and the exhaust path 14 extend independently through separate paths in a section from the branching point Ob to the joining point Oc. That is, the exhaust path 14 branches away from the intake path 12 at the branching point Ob and takes a great detour to rejoin the intake path 12 at the joining point Oc. Hereinafter, a section where the exhaust path 14 and the intake path 12 overlap with each other is referred to as a "common section", and a section where the exhaust path 14 and the intake path 12 are separated from each other is referred to as a "separate section".

In this case, the exhaust valve 18 is inserted in the separate section of the exhaust path 14, while the intake valve 16 is inserted in the separate section of the intake valve 12. The water stop filter 20 may be arranged in either the common section or the separate section, so long as the water stop filter 20 is located on an outer end Od side of the intake valve 16. In the example of FIG. 3, the water stop filter 20 is positioned in the separate section of the intake path 12. The positioning can help prevent the water stop filter 20 from getting clogged with oil vapor. This will be described in detail below. Exhaust air discharged from the motor case 101 includes minute particles of the ATF 114; i.e., oil vapor. If the water stop filter 20 is positioned in the common section, the exhaust air entraining the oil vapor would pass through the water stop filter 20. Then, the particles of oil can adhere to the water stop filter 20, which causes the water stop filter 20 to be apt to clogging. On the other hand, when the water stop filter 20 is positioned in the separate section of the intake path 12 as shown in FIG. 3, the exhaust air is not directed to pass through the water stop filter 20, which can effectively prevent the clogging of the water stop filter 20.

However, in the example of FIG. 3, the water stop filter 20 is located relatively close to the joining point Oc. For this reason, a part of the exhaust air flowing in the vicinity of the joining point Oc may escape from its path toward a water stop filter 20 side, and thus contact the surface of the water stop filter 20.

Figure 4:
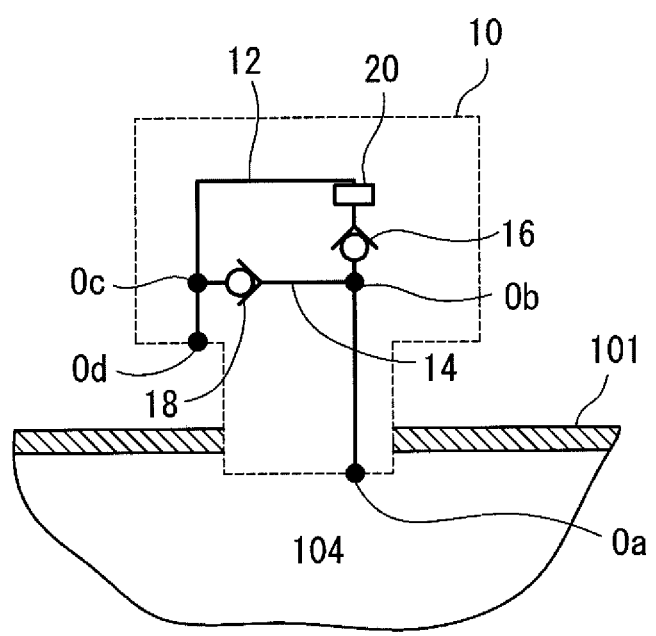
FIG. 4 is a schematic diagram showing another modification example of the breather device.

With this in view, as shown in FIG. 4, the intake path 12 may take a great detour rather than the exhaust path 14, so that the intake path 12 is longer than the exhaust path 14. Then, the water stop filter 20 may be positioned in the detour of the intake path 12. In this case, the water stop filter 20 may be placed at a position where a distance from the joining point Oc to the water stop filter 20 becomes longer than a distance from the joining point Oc to the outer end Od. With this configuration, because the exhaust air arriving at the joining point Oc is apt to flow into the exterior space without flowing toward the water stop filter 20, the exhaust air is hardly brought into contact with the water stop filter 20. In addition, the intake path 12 may be bent one or more times in the section from the joining point Oc to the water stop filter 20. With this configuration, because the exhaust air arriving at the joining point Oc is further encouraged to flow into the exterior space rather than flowing toward the water stop filter 20, the exhaust air is almost unable to contact with the water stop filter 20. As a result, it can be further ensured that the water stop filter 20 is prevented from getting clogged with oil vapor.

Figure 5:
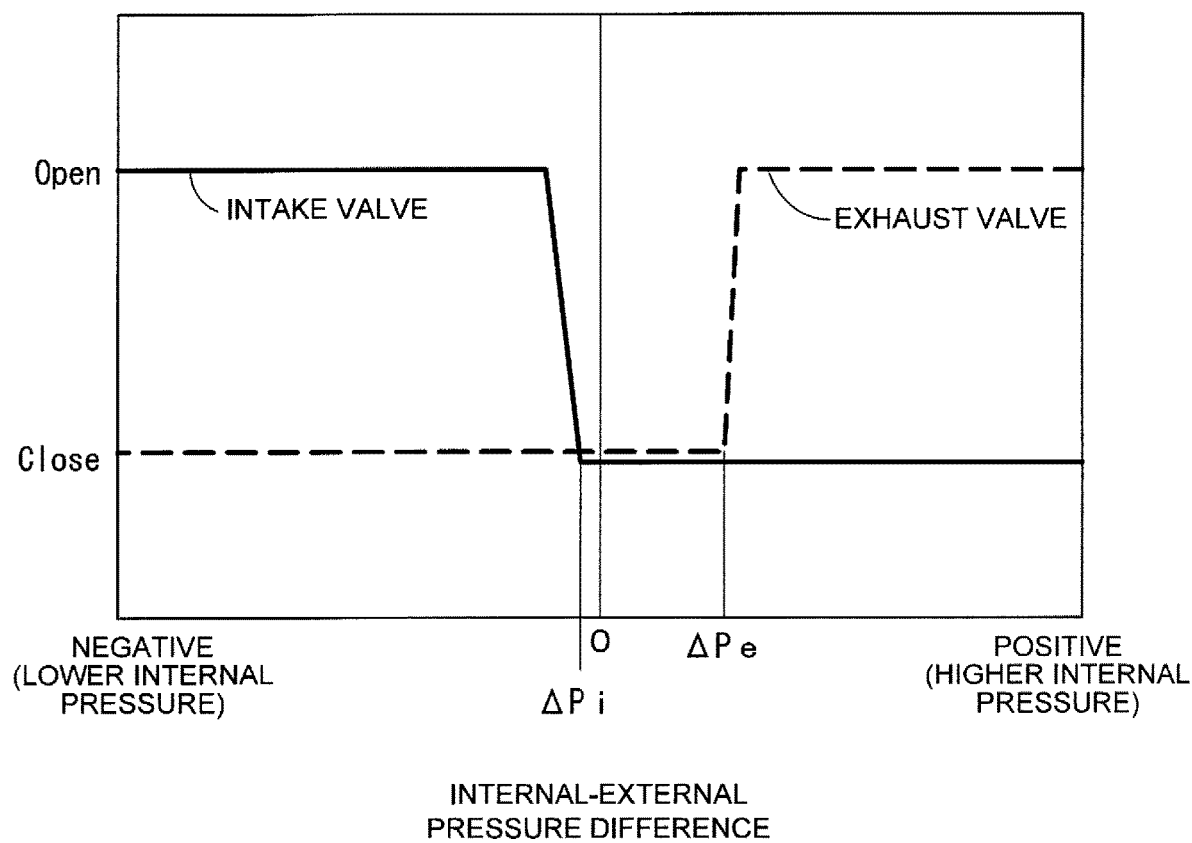
FIG. 5 is a diagram showing an example of pressures for opening an intake valve and an exhaust valve.

FIG. 5 is a graph showing an example of pressures for opening the intake valve 16 and the exhaust valve 18. In FIG. 5, the horizontal axis represents internal-external pressure differences $\Delta P$; i.e. resulting values of subtraction of (internal pressure Pi)−(external pressure Po). Further, a solid line represents an actuation status of the intake valve 16, while a broken line represents an actuation status of the exhaust valve 18. As can be seen from FIG. 5, both the intake valve 16 and the exhaust valve 18 are closed when the internal-external pressure difference $\Delta P$ is approximately zero.

When the internal pressure Pi becomes higher than the external pressure Po under a condition that the internal-external pressure difference $\Delta P$ is no smaller than $\Delta Pe$ representing values greater than 0, the exhaust valve 18 is opened. As a result, the gas excessively accumulated in the motor case 101 is released into the outside, so that the internal pressure Pi is decreased to a pressure approximately equal to the normal pressure. On the other hand, when the internal pressure Pi becomes lower than the external pressure Po under a condition that the internal-external pressure difference $\Delta P$ is no greater than $\Delta Pi$ representing values smaller than 0, the intake valve 16 is opened. As a result, outside air is introduced into the motor case 101, so that the internal pressure Pi is increased to a pressure approximately equal to the normal pressure.

Here, values of $|\Delta Pe|$ and $|\Delta Pi|$ may be approximately equal to or different from each other. In other words, an urging force to urge the valve element of the intake valve 16 toward its closure position may be equal to or different from an urging force to urge the valve element of the exhaust valve 18 toward its closure position. For example, the pressure $|Pi|$ for opening the intake valve 16 may be set to a value close to zero, in view of preventing electrical discharge with a higher degree of reliability. Further, the pressure $|Pe|$ for opening the exhaust valve 18 may be defined to be greater than the pressure for opening the intake valve 16, provided that the pressure $|Pe|$ is smaller than the internal-external pressure difference at which a leakage of oil through the oil seal 112 is started. That is, as shown in FIG. 5, the values of $|\Delta Pe|$ and $|\Delta Pi|$ may be defined to satisfy a relationship of $|\Delta Pi|<|\Delta Pe|$ in order to maintain the pressure for opening the intake valve 16 lower than that of the exhaust valve 18.

Figure 6:
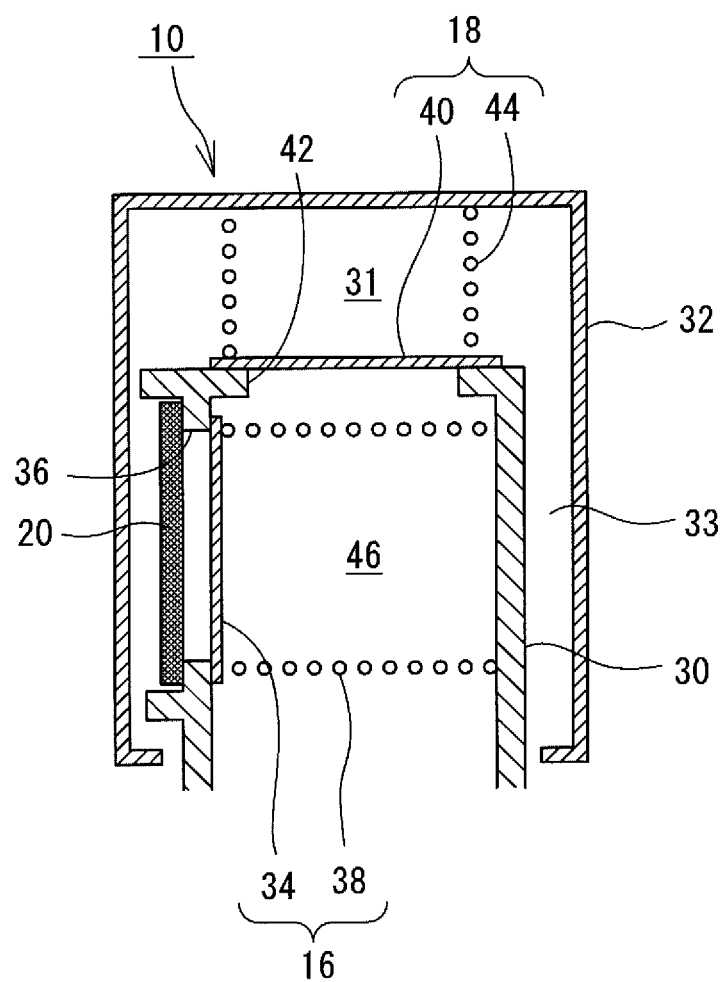
FIG. 6 is a diagram showing an example of the breather device.
Figure 7:
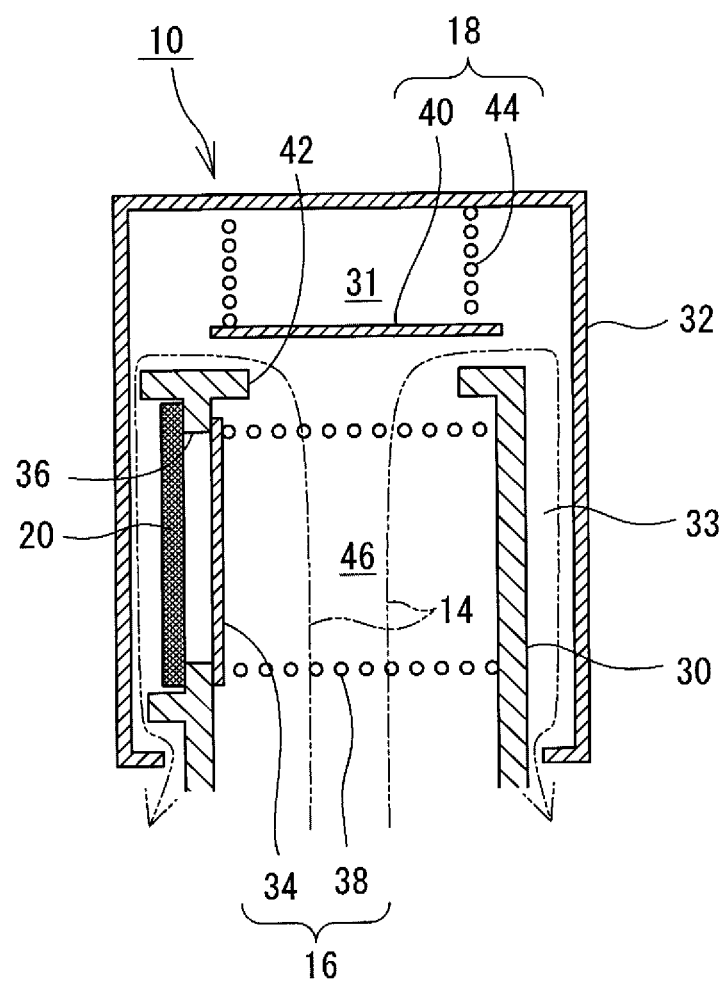
FIG. 7 is a diagram showing the breather device of FIG. 6 in a state where an internal pressure is higher than an external pressure.
Figure 8:
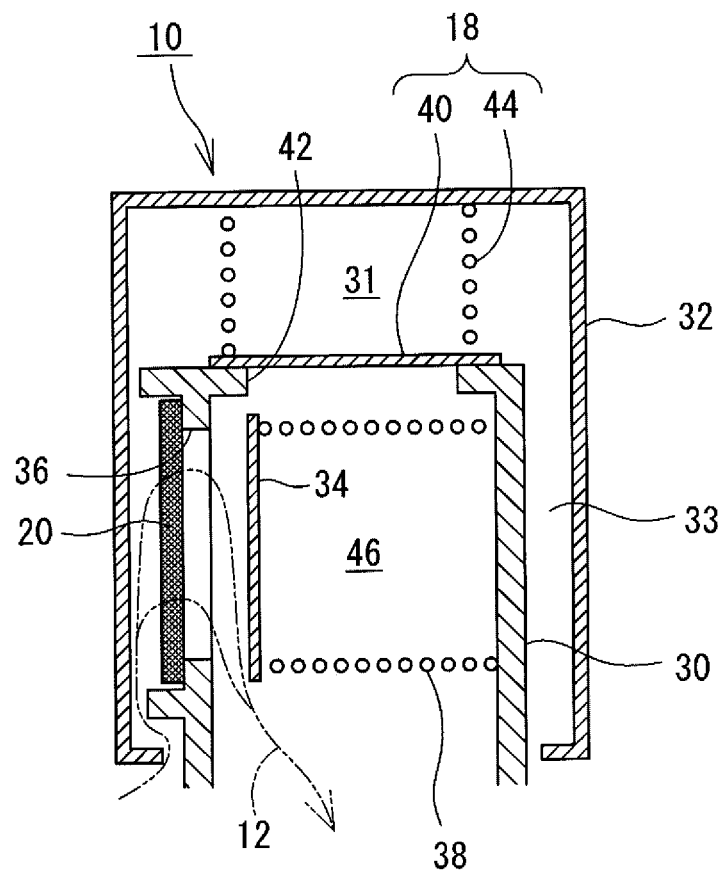
FIG. 8 is a diagram showing the breather device of FIG. 6 in a state where the internal pressure is lower than the external pressure.

Next, specific components of the breather device 10 will be described. FIGS. 6 to 8 are schematic diagrams showing an example of the breather device 10, and illustrate the breather device 10 in a state where the internal-external pressure difference $\Delta P$ is approximately equal to zero in FIG. 6, in a state where the internal pressure Pi is higher than the external pressure Po in FIG. 7, and in a state where the internal pressure Pi is lower than the external pressure Po in FIG. 8.

The breather device 10 includes a housing 30, and a cap 32 attached to an end of the housing 30. The housing 30 is attached to the motor case 101. A manner of attaching the housing 30 is not specifically limited, and the housing 30 may be attached by, for example, screwing, welding, fitting, or other means. For example, a screw hole which is a through hole may be defined on a top surface of the motor case 101, and a male screw to be screwed into the screw hole may be formed on a root portion of the housing 30, to thereby enable screw engagement of the housing 30 with the motor case 101. Alternatively, the housing 30 may be formed integrally with the motor case 101.

In the housing 30, a main hole 46 is formed as a through hole. The main hole 46 is always in communication with the interior space 104 of the motor case 101. Therefore, the pressure within the main hole 46 is equal to the internal pressure Pi of the motor case 101. In a top end surface of the housing 30, an exhaust hole 42 is defined to connect the main hole 46 to the exterior space. Further, in a circumferential surface of the housing 30, an intake hole 36 is defined to connect the main hole 46 to the exterior space.

The cap 32 is a cylindrical member configured to be placed over the housing 30 and has a top surface which is completely closed. Further, the cap 32 has an inner diameter greater than the outer diameter of the housing 30, so that an annular gap 33 through which gas can flow is created between an inner circumferential surface of the cap 32 and an outer circumferential surface of the housing 30. A lower end of the annular gap 33 is in communication with the exterior space. In addition, a circular gap 31 through which gas can flow and which is in communication with the annular gap 33 is defined between the top surface of the cap 32 and the top surface of the housing 30. The pressure in the annular gap 33 and in the circular gap 31 is equal to the external pressure Po. It should be noted that the cap 32 and the housing 30 have engaging portions (not illustrated) configured to engage with each other for preventing detachment of the cap 32 from the housing 30. When the cap 32 is provided, both the water stop filter 20, which will be explained below, and the exhaust valve 18 are hidden from the exterior space, to thereby effectively prevent dust from adhering to the water stop filter 20 and the exhaust valve 18. However, the cap 32 as described above is not an essential component, and may be omitted depending on the situation.

The exhaust hole 42 and the intake hole 36 described above are equipped with the exhaust valve 18 and the intake valve 16, respectively. The exhaust valve 18 includes an exhaust valve element 40 which is shaped like a plate for covering the exhaust hole 42 on an outer side of the housing 30, and an exhaust spring 44 configured to urge the exhaust valve element 40 toward the exhaust hole 42. The exhaust spring 44 is a coil spring which is extendable and compressible along an axial direction of the housing 30, and is placed in an elastically compressed state between the top surface of the cap 32 and the exhaust valve element 40.

The intake valve 16 includes an intake valve element 34 configured to cover the intake hole 36 on an inner side of the housing 30, and an intake spring 38 configured to urge the intake valve element 34 toward the intake hole 36. The intake spring 38 is a coil spring which is expandable and compressible along a radial direction of the housing 30, and is placed in an elastically compressed state within the main hole 36. Further, the water stop filter 20 is disposed on the outer circumferential surface of the housing 30 to cover the intake hole 36 on the outer side of the housing 30.

When the internal pressure Pi becomes higher, at least by a fixed degree, than the external pressure Po, inside air having a high pressure pushes, as shown in FIG. 7, the exhaust valve element 40 outward (i.e., toward its open position) against the urging force of the exhaust spring 44, and therefore causes the exhaust hole 42 to be open. Then, the gas within the motor case 101 is accordingly released into the exterior space, flowing through the main hole 46, the exhaust hole 42, the circular gap 31, and the annular gap 33 in that order from the root of the housing 30. On the other hand, when the internal pressure Pi becomes lower, at least by a fixed degree, than the external pressure Po, outside air pushes, as shown in FIG. 8, the intake valve element 34 inward (i.e., toward its open position) against the urging force of the intake spring 38, and therefore causes the intake hole 36 to be open. Then, air in the exterior space is introduced through the annular gap 33, the water stop filter 20, the intake hole 36, and the main hole 46 into the motor case 101. Meanwhile, even though water is introduced from the exterior space into the annular gap 33, because the water stop filter 20 does not allow passage of the water, the water cannot flow into the motor case 101.

In the example illustrated in FIGS. 6 to 8, the main hole 46 corresponds to the common section which is used for both the intake path 12 and the exhaust path 14. Further, a portion of the annular gap 33 that is located below an upper end of the intake hole 36 also corresponds to the common section which is used for both the intake path 12 and the exhaust path 14.

When the intake path 12 and the exhaust pas 14 are partially overlapped with each other as described above, the breather device 14 can be minimized in size as compared to a case where the intake path 12 is completely separated from the exhaust path 14.

Figure 9:
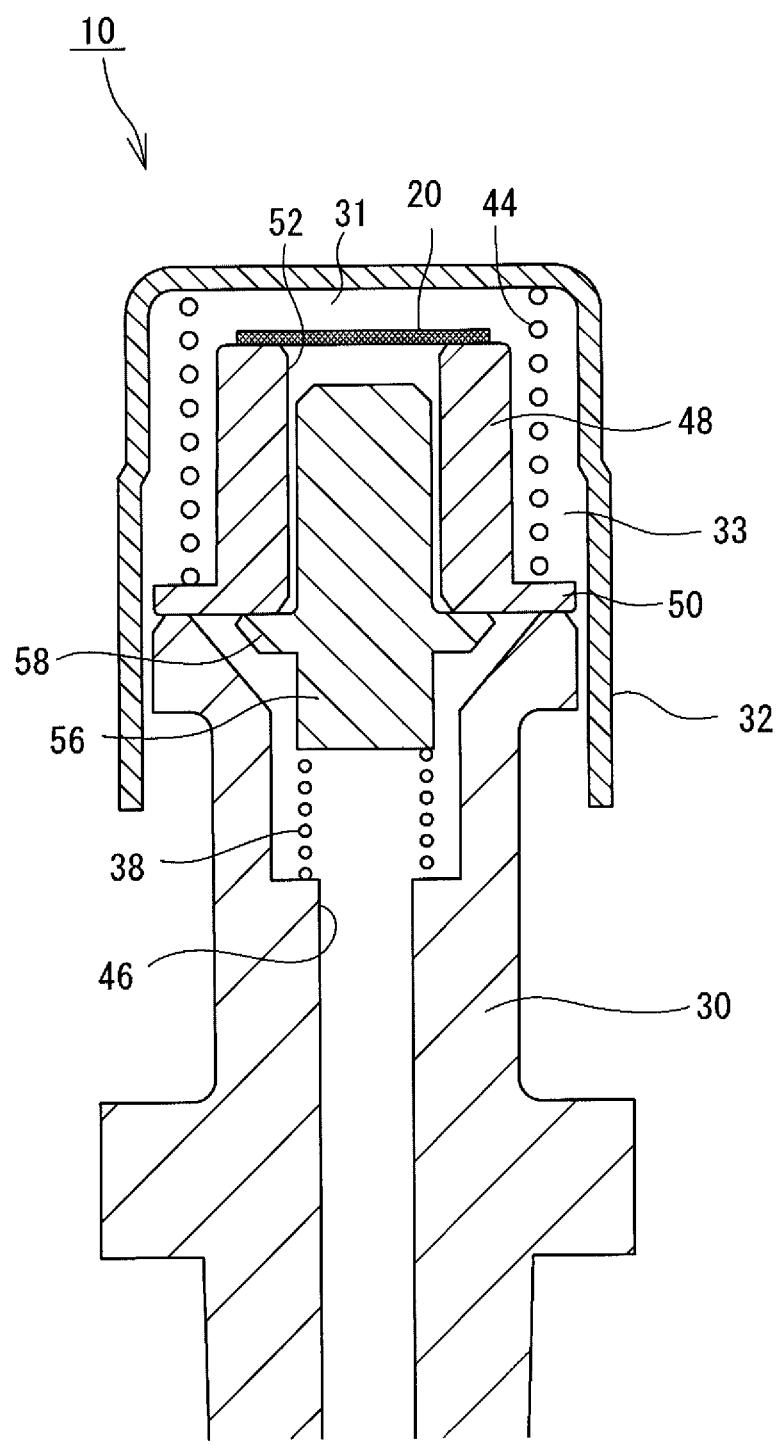
FIG. 9 is a diagram showing another example of the breather device.
Figure 10:
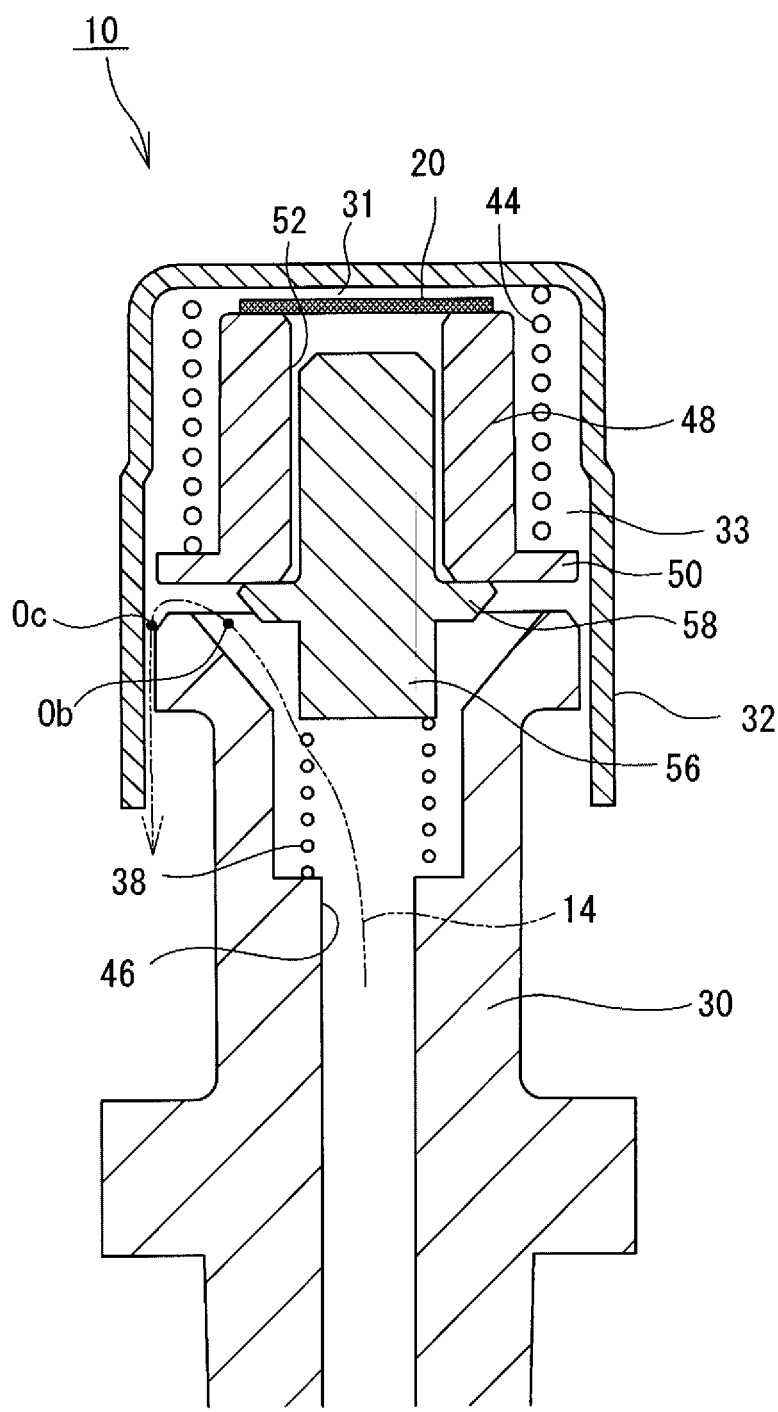
FIG. 10 is a diagram showing the breather device of FIG. 9 in the state where the internal pressure is higher than the external pressure.
Figure 11:
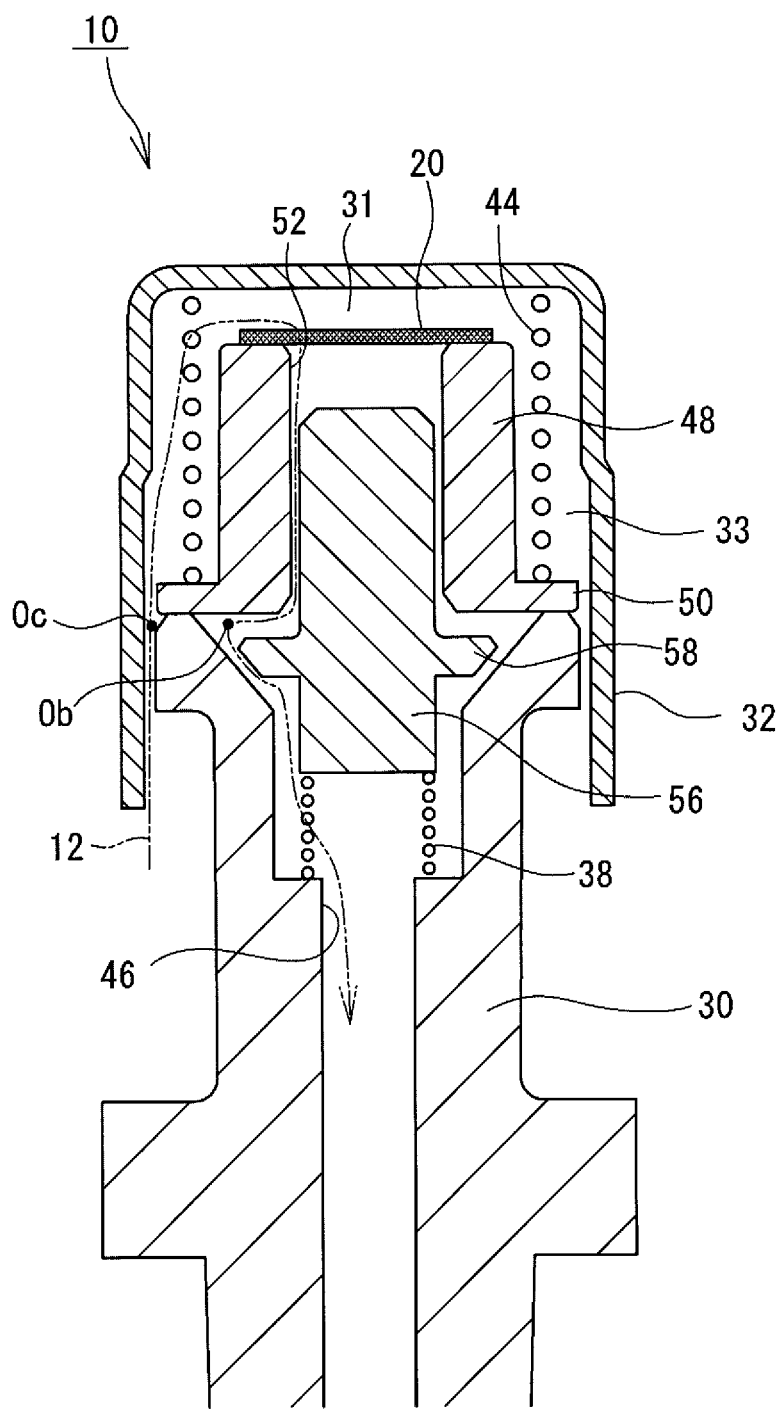
FIG. 11 is a diagram showing the breather device of FIG. 9 in the state where the internal pressure is lower than the external pressure.

Next, another example of the breather device 10 will be explained with reference to FIGS. 9 to 11. FIGS. 9 to 11 are diagrams showing the other example of the breather device 10 and illustrate the breather device 10 in the state where the internal-external pressure difference ΔP is approximately equal to zero in FIG. 9, in the state where the internal pressure Pi is higher than the external pressure Po in FIG. 10, and in the state where the internal pressure Pi is lower than the external pressure Po in FIG. 11.

The breather device 10 in this example includes the housing 30, a first piston 48, a second piston 56, and the cap 32. The root portion of the housing 30 is attached to the top part of the motor case 101 by means of screwing or the like. In the housing 30, the main hole 46 is defined as a through hole along the axial direction of the housing 30. The main hole 46 is always in communication with the interior space 104 of the motor case 101.

The first piston 48 is a first movable member disposed in an upper portion of the housing 30. A base end (i.e., an end on a housing 30 side) of the first piston 48 has a first flange 50 which is protruded outward along the radial direction. The first flange 50 is brought into intimate contact with the top end surface of the housing 30 to close and isolate the main hole 46 from the outside. The first piston 48 has a sub hole 52 defined as a through hole along the axial direction. The water stop filter 20 configured to completely cover the sub hole 52 is attached to a tip end surface (i.e., a top end surface) of the first piston 48.

The first piston 48 is urged to approach the housing 30 by the exhaust spring 44. The exhaust spring 44 is a coil spring which is placed in a compressed state between the first flange 50 and the top surface of the cap 32. The exhaust spring 44 functions as a first urging member for urging the first piston 48 (the first movable member) toward a position where the first piston 48 closes the main hole 46. The first piston 48 is advanceable and retractable between a first closure position in which the first flange 50 is brought into intimate contact with the top end surface of the housing 30 by the urging force of the exhaust spring 44, and a first open position in which the first flange 50 is separated from the housing 30 against the urging force of the exhaust spring 44.

The second piston 56 is a second movable member disposed within the main hole 46. The outer diameter of the second piston 56 is smaller than both the diameter of the main hole 46 and the diameter of the sub hole 52. Therefore, a gap through which gas can flow is created between an outer circumferential surface of the second piston 56 and inner circumferential surfaces of the main hole 46 and the sub hole 52. The second piston 56 has, in a middle region of its axial length, a second flange 58 protruding outward along the radial direction. The outer diameter of the second flange 58 is greater than the diameter of the sub hole 52. The second flange 58 is configured to close the sub hole 52 when the second flange 58 is brought into intimate contact with a lower end surface of the first piston 48.

The second piston 56 is urged to approach the first piston 48 by the intake spring 38. The intake spring 38 is a coil spring which is placed in a compressed state between a bottom surface of the second piston 56 and an annular bottom of a staged portion of the main hole 46. The intake spring 38 functions as a second urging member for urging the second piston 56 (the second movable member) toward a position where the second piston 56 closes the sub hole 52. The second piston 56 is advanceable and retractable between a second closure position in which the second flange 58 is brought into intimate contact with the lower end surface of the first piston 48 by the urging forth of the intake spring 38, to thereby cover the sub hole 52, and a second open position in which the second flange 58 is separated from the first piston 48 against the urging force of the intake spring 38.

The cap 32 has a cylindrical body which is placed over the first piston 48 and has a top surface which is completely closed. The cap 32 is engaged with a part of the housing 30 so as not to be detached from the housing 30. The annular gap 33 is defined between the inner circumferential surface of the cap 32 and the outer circumferential surface of the housing 30, and the circular gap 31 is defined between the top surface of the cap 32 and the top surface of the first piston 48. A lower end of the annular gap 33 is in communication with the exterior space, and the pressure in the annular gap 33 and in the circular gap 31 is equal to the external pressure Po. The cap 32 has an advantageous effect of protecting the water stop filter 20 and other components from dust, but may be omitted depending on the situation.

When the internal pressure Pi becomes higher, at least by a fixed degree, than the external pressure Po, the inside air having a high pressure pushes, as shown in FIG. 10, the first piston 48 upward (i.e., toward the open position) against the urging force of the exhaust spring 44. As a result, the first flange 50 is separated from the top end surface of the housing 30, so that a gap is created between the first flange 50 and the housing 30. In other words, the main hole 46 is connected to the exterior space, without an intervention through the sub hole 52. The gas excessively accumulated within the motor case 101 is discharged from the gap between the first flange 50 and the housing 30 through the annular gap 33 into the exterior space. That is, in this example, the first flange 50 functions as the exhaust valve element 40 which is moved to exhaust the gas.

On the other hand, when the internal pressure Pi becomes lower, at least by a fixed degree, than the external pressure Po, the outside air pushes, as shown in FIG. 11, the second piston 56 downward (i.e., toward the open position) against the urging force of the intake spring 38, and therefore causes the sub hole 52 to be open. In other words, the main hole 46 is connected through the sub hole 52 to the exterior space. As a result, air in the exterior space is introduced through the annular gap 33, the circular gap 31, the water stop filter 20, the sub hole 52, and the main hole 46 into the motor case 101. Meanwhile, even though water is present in the exterior space, the water is blocked by the water stop filter 20, and therefore is not able to enter the motor case 101.

In this example shown in FIGS. 9 to 11, the main hole 46 corresponds to the common section which is used for both the intake path 12 and the exhaust path 14. Further, a lower portion of the annular gap 33 located below the top end of the housing 30 also corresponds to the common section which is used for both the intake path 12 and the exhaust path 14.

Further, in this example, when viewed from a downstream side of an intake air flow, the intake path 12 is branched off the exhaust path 14 at the branching point Ob located in the vicinity of the top end of the main hole 46, takes a great upward detour, and subsequently rejoins the exhaust path 14 at the joining point Oc located within the annular gap 33. The water stop filter 20 is disposed in the detour. Here, as is evident from FIG. 11, a distance from the water stop filter 20 to the joining point Oc is considerably longer than a distance from the joining point Oc to the outer end, and the intake path 12 is bent one or more times in a section from the water stop filter 20 to the joining point Oc. In this way, because the exhaust gas having arrived at the joining point Oc is hardly able to flow to the water stop filter 20, the clogging of the water stop filter 20 with oil vapor can be effectively prevented.

Then, in this example, the first piston 48 is composed of a material which has a higher degree of elasticity than the housing 30 and the second piston 56. For example, the housing 30 and the second piston 56 may be composed of a metal, such as aluminum or steel, while the first piston 48 may be composed of a polymer material, such as a synthetic resin or natural rubber. When the components are formed in this way, adhesion of the first piston 48 to both the housing 30 and the second piston 56 is enhanced, which can ensure that the exhaust path 14 and the intake path 12 are reliably closed. Only in view of enhancing the adhesion, it could be also contemplated that the first piston 48, the housing 30, and the second piston 56 would all be formed of the same resin. However, when the components are formed in this way, materials of two components might be fused to each other at a contact surface therebetween, which would cause the first piston 48 to experience difficulties in separating from the housing 30 or the second piston 56. In this example, because the first piston 48 is formed of a material different from that of the housing 30 and the second piston 56, the fusing at the contact surface can be prevented with a high degree of reliability.

In another form, rather than forming the first piston 48 with such a highly elastic material, a sealing member formed of a highly elastic material may be placed only in a contact region where the first piston 48 contacts the housing 30 and the second piston 56. For example, the sealing member composed of the highly elastic material may be fixedly attached to any one or all of the lower end surface of the first flange 50, the top end surface of the housing 30, and an upper surface of the second flange 58. In this way, it can be ensured that the first piston 48 is reliably brought into intimate contact with the housing 30 and the second piston 56.

Further, in this example, the water stop filter 20 is fixed to the top end surface of the first piston 48. A method for the fixing may be selected as appropriate depending on materials of the first piston 48 and the water stop filter 20, costs, and other factors. For example, the water stop filter 20 may be adhered onto the top end surface of the first piston 48 by means of an adhesive agent. When the adhesive agent is not compatible with one or both of the water stop filter 20 and the first piston 48, the water stop filter 20 may be attached to the first piston 48 by means of ultrasonic welding. Further, when the first piston 48 is composed of a resin, the water stop filter 20 may be integrally formed with the first piston 48 through insert molding. Still further, the first piston 48, which is urged downward by the exhaust spring 44 in this example, may be urged downward by its self-weight. With this configuration, the number of components can be reduced.

In this specification, the breather device 10 has been described with reference to the example in which the breather device 10 is attached to a motor case for housing the motor 102, although the technique described herein is not limited to the attachment to the motor case, and the breather device 10 may be attached to other types of casings.

REFERENCE SIGNS LIST

10 breather device, 12 intake path, 14 exhaust path, 16 intake valve, 18 exhaust valve, 20 water stop filter, 30 housing, 31 circular gap, 32 cap, 33 annular gap, 34 intake valve element, 36 intake hole, 38 intake spring, 40 exhaust valve element, 42 exhaust hole, 44 exhaust spring, 46 main hole, 48 first piston (first movable member), 50 first flange, 52 sub hole, 56 second piston (second movable member), 58 second flange, 100 motor unit, 101 motor case, 102 motor, 104 interior space, 106 gear, 108 output shaft, 110 bearing, 112 oil seal.

The invention claimed is:

1. A breather device attached to a target case for regulating an internal pressure of the target case, the breather device comprising:
    an intake path which is configured to communicate between an interior space of the target case and an exterior space;
    an exhaust path which is configured to communicate between the interior space and the exterior space, and is at least partially separated from the intake path;
    an intake valve which is inserted in the intake path and is configured to allow outside air to flow into the interior space only when the internal pressure is lower, at least by a fixed degree, than an external pressure;
    an exhaust valve which is inserted in the exhaust path and is configured to allow gas within the interior space to flow toward the exterior space only when the internal pressure is higher, at least by a fixed degree, than the external pressure; and
    a water stop filter which is disposed, in the intake path, upstream of the intake valve in an intake air flowing direction and is configured to allow passage of gas while blocking passage of liquid, wherein:
    the intake path and the exhaust path extend through an inner end which is an end on an inner space side, a branching point, a joining point, and an outer end which is an end on an exterior space side, and
    the intake path and the exhaust path are shared with each other in a section from the inner end to the branching point and in a section from the joining point to the outer end, and are separated from each other in a section from the branching point to the joining point.

2. The breather device according to claim 1, wherein:
    the water stop filter is positioned in the section from the branching point to the joining point of the intake path, and
    a distance from the joining point to the outer end is shorter than a distance from the joining point to the water stop filter.

3. The breather device according to claim 1, wherein the intake path is bent one or more times in the section from the joining point to the water stop filter.

4. A breather device attached to a target case for regulating an internal pressure of the target case, the breather device comprising:
    an intake path which is configured to communicate between an interior space of the target case and an exterior space;
    an exhaust path which is configured to communicate between the interior space and the exterior space, and is at least partially separated from the intake path;
    an intake valve which is inserted in the intake path and is configured to allow outside air to flow into the interior space only when the internal pressure is lower, at least by a fixed degree, than an external pressure;
    an exhaust valve which is inserted in the exhaust path and is configured to allow gas within the interior space to flow toward the exterior space only when the internal pressure is higher, at least by a fixed degree, than the external pressure;
    a water stop filter which is disposed, in the intake path, upstream of the intake valve in an intake air flowing direction and is configured to allow passage of gas while blocking passage of liquid;
    a housing attached to the target case and having a main hole which is defined to be always in communication with the interior space;
    a first movable member configured to be advanceable and retractable between a first closure position in which the first movable member is brought into contact with the housing to close the main hole and a first open position in which the first movable member is separated from the housing to allow the main hole to communicate with the exterior space, the first movable member having a sub hole which is defined to connect the main hole with the exterior space at the first closure position;
    a second movable member disposed in the main hole and configured to be advanceable and retractable between a second closure position in which the second movable member is brought into contact with the first movable member to close the sub hole and a second open position in which the second movable member is separated from the sub hole to allow the main hole to communicate through the sub hole with the exterior space;
    a first urging member configured to urge the first movable member toward the first closure position; and
    a second urging member configured to urge the second movable member toward the second closure position, wherein:
    the water stop filter is positioned so as to be opposite across the sub hole from the second movable member and configured to cover the sub hole,
    the first movable body and the first urging member function as the exhaust valve,
    the second movable member and the second urging member function as the intake valve, and
    the first movable member is composed of a material having a higher degree of elasticity than that of the second movable member and the housing.

5. A breather device attached to a target case for regulating an internal pressure of the target case, the breather device comprising:
    an intake path which is configured to communicate between an interior space of the motor case and an exterior space;
    an exhaust path which is configured to communicate between the interior space and the exterior space, and is at least partially separated from the intake path;
    an intake valve which is inserted in the intake path and is configured to allow outside air to flow into the interior space only when the internal pressure is lower, at least by a fixed degree, than an external pressure;
    an exhaust valve which is inserted in the exhaust path and is configured to allow gas within the interior space to flow toward the exterior space only when the internal pressure is higher, at least by a fixed degree, than the external pressure, and
    a water stop filter which is disposed, in the intake path, upstream of the intake valve in an intake air flowing direction and is configured to allow passage of gas while blocking passage of liquid, wherein the target case is a motor case for housing a motor.

* * * * *